(12) United States Patent
Andresen

(10) Patent No.: US 12,358,415 B1
(45) Date of Patent: Jul. 15, 2025

(54) PORTABLE, MULTI-CHAMBER EMERGENCY SHELTER

(71) Applicant: Harrold C. Andresen, Alvarado, TX (US)

(72) Inventor: Harrold C. Andresen, Alvarado, TX (US)

(*) Notice: Subject to any disclaimer, the term of this patent is extended or adjusted under 35 U.S.C. 154(b) by 308 days.

(21) Appl. No.: 17/903,415

(22) Filed: Sep. 6, 2022

(51) Int. Cl.
| | | |
|---|---|---|
| B60P 3/34 | (2006.01) | |
| B60H 1/00 | (2006.01) | |
| B62D 29/00 | (2006.01) | |
| B62D 61/12 | (2006.01) | |
| B62D 63/08 | (2006.01) | |

(52) U.S. Cl.
CPC ............ B60P 3/34 (2013.01); B60H 1/00564 (2013.01); B62D 29/007 (2013.01); B62D 61/12 (2013.01); B62D 63/08 (2013.01)

(58) Field of Classification Search
CPC ..... B60P 3/34; B60H 1/00564; B62D 29/007; E04H 9/00
USPC .......................................................... 280/30
See application file for complete search history.

(56) References Cited

U.S. PATENT DOCUMENTS

| | | | |
|---|---|---|---|
| 4,615,158 A | 10/1986 | Thornon | |
| 5,956,907 A * | 9/1999 | Martin | B60P 3/36 |
| | | | 52/79.9 |
| 6,151,841 A | 11/2000 | Green | |
| 6,161,345 A | 12/2000 | Hope et al. | |
| 6,412,231 B1 * | 7/2002 | Palatin | E04H 9/10 |
| | | | 52/79.14 |
| 7,533,942 B2 * | 5/2009 | Kennedy | E04H 9/12 |
| | | | 299/95 |
| 7,690,159 B1 * | 4/2010 | Arnold | A01K 1/033 |
| | | | 52/79.5 |
| 8,985,251 B2 * | 3/2015 | Carney | E21F 11/00 |
| | | | 180/9.42 |
| 9,464,953 B2 * | 10/2016 | Wirthlin | G01L 5/136 |
| 10,458,141 B2 * | 10/2019 | Hensen | E04B 1/34384 |
| 2003/0126805 A1 * | 7/2003 | Roberts | E04H 9/14 |
| | | | 52/80.1 |
| 2005/0206102 A1 * | 9/2005 | Carver | B62B 3/009 |
| | | | 280/30 |
| 2006/0080936 A1 * | 4/2006 | Dooley | E04H 9/14 |
| | | | 52/834 |
| 2008/0120919 A1 * | 5/2008 | VanBasten | A62B 31/00 |
| | | | 52/741.1 |
| 2008/0142059 A1 * | 6/2008 | Bonebrake | B60P 3/34 |
| | | | 135/88.1 |
| 2010/0230414 A1 * | 9/2010 | Hunter | H01M 8/2475 |
| | | | 220/553 |
| 2012/0183380 A1 * | 7/2012 | Aubrey | B60P 1/027 |
| | | | 414/484 |

(Continued)

*Primary Examiner* — Hau V Phan
(74) *Attorney, Agent, or Firm* — Gugliotta & Gugliotta LPA

(57) ABSTRACT

An emergency shelter is provided including a multi-chambered emergency shelter storm trailer that is portable, providing a multi-chambered enclosure supported on a trailer. A trailer chassis includes a retractable suspension to allow wheels be extended to allow for road transport or retraction for affixing the chassis to a foundation. The chassis may be a towable and street legal structure. The instant abstract is neither intended to define the invention disclosed in this specification nor intended to limit the scope of the invention in any way.

20 Claims, 1 Drawing Sheet

(56) References Cited

U.S. PATENT DOCUMENTS

| | | | | |
|---|---|---|---|---|
| 2012/0222367 | A1* | 9/2012 | Wirtz | E04H 9/14 |
| | | | | 52/745.2 |
| 2013/0031845 | A1* | 2/2013 | Ali | E04H 9/14 |
| | | | | 52/79.1 |
| 2013/0291450 | A1 | 11/2013 | Hillje | |
| 2013/0298477 | A1* | 11/2013 | Krummenacher | E04H 15/20 |
| | | | | 52/2.11 |
| 2015/0042071 | A1* | 2/2015 | Hamm | B60D 1/58 |
| | | | | 280/477 |
| 2015/0096478 | A1* | 4/2015 | Magiera | E04H 9/14 |
| | | | | 109/23 |
| 2015/0345168 | A1 | 12/2015 | Wirtz | |
| 2016/0130830 | A1* | 5/2016 | Magiera | E04H 9/06 |
| | | | | 109/1 S |
| 2016/0138289 | A1* | 5/2016 | Ferrari | E04H 9/14 |
| | | | | 52/79.1 |
| 2017/0081870 | A1* | 3/2017 | Hensen | E04B 1/34384 |
| 2017/0158014 | A1* | 6/2017 | Lu | B60G 7/00 |
| 2019/0249552 | A1* | 8/2019 | Tessien | B28B 7/26 |

* cited by examiner

PORTABLE, MULTI-CHAMBER EMERGENCY SHELTER

RELATED APPLICATIONS

There are no previously filed, nor currently any co-pending applications, anywhere in the world. Additional applications of related continuity are further disclosed as part of the Application Data Sheet filed pursuant to 37 C.F.R. § 1.76. All Related Applications are incorporated by reference as if fully rewritten herein.

BACKGROUND OF THE INVENTION

1. Field of the Invention

The present invention relates generally to emergency shelters and, more particularly, to the secured locations adapted for use in the face of various types of emergencies (fires, floods, tornados, etc.).

2. Description of the Related Art

Natural disasters can come in many forms and result in personnel hazards from fire, water, wind, or the like. Each poses distinct problems that must be addressed in the event an emergency shelter is to be erected.

Water and flooding can come in many forms. Placement of occupancy spaces above a particular elevation can alleviate flooding in many situations, but in the event of an extraordinary storm surge or flooding occurs in excess of even a 100-year flood above Base Flood Elevation (BFE), merely elevating a structure may not be sufficient and mobility of a structure would be preferred.

Further, protection from wind or fire requires even different adaptation in order to provide secure occupancy. Strength and combustion resistance of externally contacting materials of construction thereby creates an even greater, if not nearly unitized, ranges of solutions.

Some methods and devices are known that incorporate various mechanisms for identifying providing protection during natural disasters. For example:

U.S. Pat. No. 4,615,158, issued in the name of Thornton, discloses a mobile home tornado shelter specially adapted for use with mobile home lots. The shelter is an underground enclosure defined by an annular sidewall and a top and bottom. The top of the enclosure has an entrance and egress passageway in communication with both the enclosure and the bottom of a mobile home. The passageway is surrounded by a flexible sidewall which is moveably attached to the top of the underground disclosure and the bottom of the mobile home. An associated collapsible stepladder allows convenient and egress. When the mobile home unit is moved, the passageway sidewall may be removed, and the shelter sealed until a new unit is moved in place.

U.S. Pat. No. 5,956,907, issued in the name of Martin, discloses a tornado escape capsule for trailer homes or a house trailer having a structural framework which defines an interior compartment dimensioned to releasably receive the escape capsule which is connected to a ground engaging anchor by a tether whereby the escape capsule remains attached to the ground engaging anchor in the event that a tornado destroys the house trailer that originally surrounded the escape capsule.

U.S. Pat. No. 6,151,841, issued in the name of Green, discloses a portable tornado shelter constructed as an inexpensive, prefabricated portable tornado shelter assembled from four equilateral triangular sides, a base frame, and a floor, to form a square pyramid-shaped enclosure with latched doors and PLEXIGLAS® windows. The shelter allows constant air pressure equalization between its interior and exterior. The shelter is held firmly to the ground with four auger bolts.

U.S. Pat. No. 6,161,345, issued in the name of Hope et al., discloses a tornado shelter having a rectangular horizontal top, a rectangular horizontal bottom disposed below and parallel to the top, a vertical forward end connected transversely the top and bottom, a vertical rear end connected transversely to the top and bottom opposite from the forward end, a pair of vertical side members connecting the top and the bottom on opposite sides thereof and extending longitudinally from the rear end to the front end, a substantially rectangular door frame connected to the top adjacent the front end, an access opening in the top communicating with the interior of the door frame, longitudinally extending tracks mounted in the door frame, a flat horizontally extending door adapted to be mounted in the door frame, the door having rollers thereon adapted to engage the tracks on the ledge, the door being mounted in a closed position over the opening in the top when the door is adjacent the front of the tornado shelter, a latch mechanism attached to the forward edge of the door for securing the door to the front end, a cover plate having vent holes therein covering the rear portion of the door frame, the latch being release able for rolling the door rearwardly into position underneath the cover plate and exposing the access opening in the top so that entry and egress came be achieved with respect to the tornado shelter.

U.S. Patent Application Publication 2013/0291450, filed in the name of Hillje, discloses a tornado storm shelter that is an 8 foot by 20 foot by 8 foot standard steel overseas-container with one 3-foot wide door in the rear. The container is converted into a completely self-contained shelter building. The shelter is fully equipped with lavatory and sink, kitchen and sleeping quarters. It has its own gas/electric and water supply. The shelter is designed so that it can even be used as a living space when there is no emergency.

And, U.S. Patent Application Publication 2015/0345168, assigned to American Safety Shelter LLC, teaches an improved above-ground storm shelter having sidewalls comprised of two panels, an outer panel and an inner panel, a double-swing door means for allowing ingress and egress, a door bar for securely closing the double-swing doors during a storm event, and a roof adapted to be affixed thereto, whereby sound of articles striking the sidewalls during a storm event is lessened, and the two panels provide enhanced structural integrity compared with a single panel of comparable thickness. The sidewalls are manufactured in modular segments adapted to be joined together to form a desired size of shelter. At least one segment has defined therein a ventilation port with a protective plate and grate for preventing projectiles from entering the shelter during a storm event.

However, such innovations are generally designed with a specific hazard or hazards in mind, while many types of emergency can arise. Fire, flood, high winds, or other natural disasters each require specific features for protection of life and limb. Consequently, a need exists to an improved storm shelter that may be adapted for various threats while still being portable.

SUMMARY OF THE INVENTION

It is thus an object of the present invention to provide an emergency shelter that can be adapted for any type of natural disaster threat.

It is a feature of the present invention to provide such an emergency shelter that can be transported to a remote location if needed, or stored inconspicuously at a base location.

Briefly described according to the preferred embodiment, a system for emergency shelter protection is provided including a multi-chambered emergency shelter storm trailer that is portable in a manner that is easily towable by a light truck or SUV. The multi-chambered emergency shelter forms at least two chambers formed enclosed by fireproofed plate steel, with more than one closeable access orifice creating access to and egress from the occupancy volume. A chassis supporting the multi-chambered emergency shelter storm trailer includes a retractable suspension to allow wheels be extended to allow for road transport or retraction for affixing the chassis to a foundation. The chassis may be a towable and street legal structure.

Advantages of the present invention included providing for emergency shelter for types of emergencies that may arise, including fire, flood, high winds, or other natural disasters.

Further advantages of a mobile, deployable, trailer mounted emergency shelter allows for storage when not needed, and in the event of a natural disaster or other hazard it may be deployed to be relocated in order to avoid the hazard.

Further objects, features, elements and advantages of the invention will become apparent in the course of the following description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
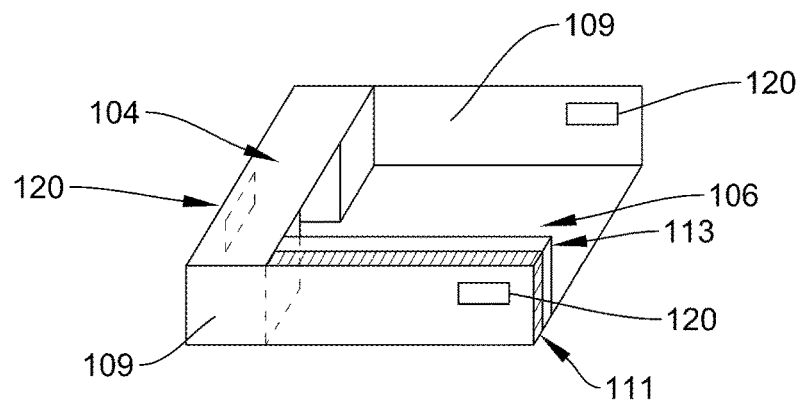
FIG. 1 is a partially exploded perspective schematic view of a multi-chambered storm trailer according to a preferred embodiment of the present invention.
Figure 2:
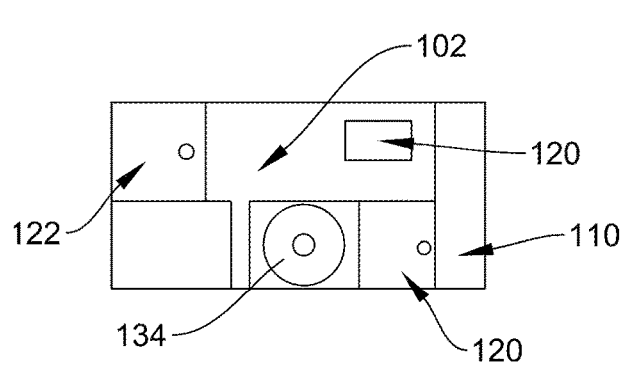
FIG. 2 is a side elevational schematic thereof, shown is an anchorable condition.
Figure 3:
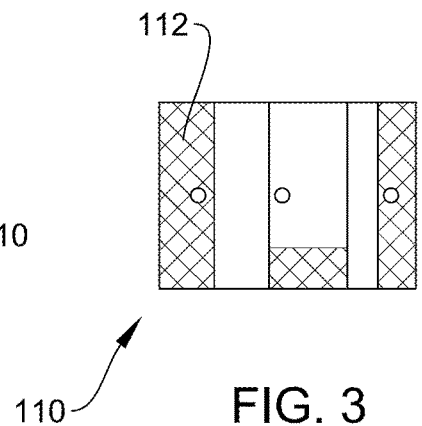
FIG. 3 is a rear elevational schematic thereof.

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

By way of example, and not meant as a limitation, the dimensions provided throughout are intended to be exemplary only, representing only one of numerous design choices shown for purpose of explanation and not meant to be limiting. Further, the invention is capable of other embodiments and of being practiced or carried out in a variety of ways. It is to be understood that the phraseology and terminology employed herein is for the purpose of description and not of limitation.

Finally, it should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112 (f).

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the Figures, wherein like reference numerals indicate the same parts throughout the several views, a multi-chambered storm trailer is shown, generally noted as 100. The trailer 100 encloses and provides an occupancy volume 102 that is segmented into at least two connected chambers, a front occupant chamber 104 and a rear occupant chamber 106. In any configuration it is preferred that the occupancy volume 102 is configured such as to be physically positioned at least 18" above a lower floor plane of the trailer 100. Such vertical offset facilitates security of the occupancy volume 102 in the event of flooding. Each chamber 104, 106 provides a secure area for the occupancy of adults, children or pets. The combination of the two chambers 104, 106 accommodates many combinations of 5 occupants, adults and/or children and/or pets.

Each chamber 104, 106 is formed of walls 109 made of plate steel and are further fireproofed. Fireproofing may be accomplished via lining 111 with heat resistant blankets, or, alternately, the plates steel walls 109 may be spray coated with a spray-applied fire-resistive materials or SFRM, such as low-density fibers or cementitious compounds. Such SFRM may be applied wet or dry, in coatings of the desired thickness, to provide heat resistance to the walls.

Inside wall surfaces of the occupant chambers 104, 106 may also be paneled 113 with materials to eliminate condensation from the plate steel, or to allow the occupants to customize the interior with shelves, storage or even decor elements. In an alternate configuration, a distinct, segmented storage area 110 may be provided separate from the occupant areas 104, 106 and accessible from doors 112 accessible from the exterior of the trailer 100. In a preferred embodiment a minimum of five (5) separate storage compartments may be provided. In all preferred embodiments, each storage compartment is physically isolated from any adjacent or other storage compartments to provide physical isolations of the storage volumes. Such doors 112 are preferably accessible from the exterior of the trailer 100, and may be locked or lockable for security of the contents.

The exterior surfaces of the trailer walls may be coated with fire resistant paint 115. Further, each occupant chamber 104, 106 may form one or more discrete viewing ports 120 to allow for visual inspection of the outside environment in a way that prevents exposure of an occupant to external hazards. Further still, access/egress doors 122 may be provided to accommodate entering and leaving the occupancy chambers 104, 106. In a more preferred embodiment, at least three (3) individual access/egress doors 122 may be provided in which each door 122 is positioned within a separate plate steel wall 109 on different spacial planes, including the floor or ceiling, wherein each spacial plane is about 90° apart. In such a configuration in which three separate egress formations are about 90° apart an occupant will always have at least one, and perhaps more than one, egress structure through which to exit in the unfortunate event that the trailer 100 is dislodged from its foundation or otherwise disoriented or reoriented during a natural disaster (e.g., through wind, flood, etc.). Any accessible portal such as the doors 122 should further include safety locks that will prevent an occupant from being accidentally locked in.

Ventilation of the occupant chambers is further provided. This may be accomplished from permanent air passages formed within each door, hatch or window.

The trailer 100 may further be designed to be an above-ground structure outwardly aesthetically adapted such at to divert or minimize the look of a shed or a recreational vehicle. The entire trailer 100 may be externally covered with a vinyl wrap of the type commercially used in vehicle vinyl wrap products that provide covering for a vehicle's original paint with a heat shrink vinyl film.

Figure 4:
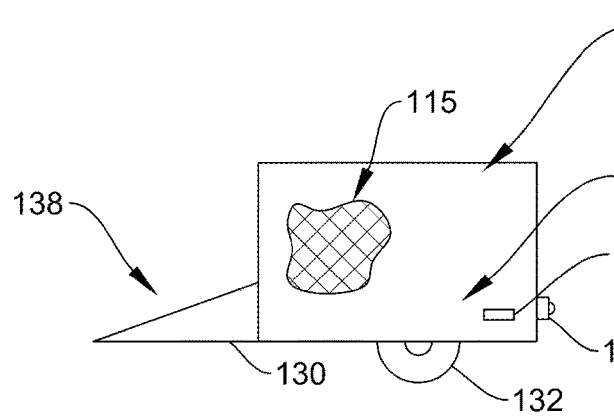
FIG. 4 is a side elevational schematic thereof, shown in a towable condition.
Figure 5:
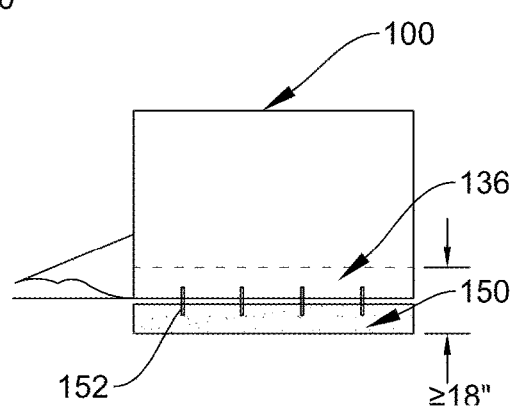
FIG. 5 is a side elevational schematic of the multi-chambered storm trailer depicted secured to a foundational concrete slab.

Referring in conjunction with FIG. 4, the trailer 100 is preferrably adapted to be mounted onto a towable chassis 130. The chassis 130 may include axle and suspension 132 that is preferrably retractable, thereby allowing wheels 134 to be extended for transport or retracted for securing to a location. As shown in conjunction with FIG. 5, with the suspension 132/wheels 134 retracted the trailer 100 may be securely mounted to a foundation 150, such as a concrete slab or other ground securing mechanism. Mounting or fixed securing to a slab may be facilitated via various mounting holes and/or hook points 152 affixed about the frame 136.

In a most preferred embodiment, the chassis 130 may be adapted to become a street legal trailer, such as to include, inter alia, a tow bar 138, tail lights 140 and side lights 142. Such a street legal trailer 130 may preferably be capable of being towed via a half-ton light truck or heavy duty SUV. Preferably, the overall configuration of the trailer 100 may be about 7'4" long×7'4" wide×6'6" tall or otherwise adapted to fit into a residential garage, under a carport or within a similar outdoor storage facility.

2. Operation of the Preferred Embodiment

In operation, the trailer 100 may be stored in an otherwise inconspicuous manner. In the event of a natural disaster or other hazard, the trailer 100 may be deployed to be relocated in order to avoid the hazard. Whether in its original location, or a new relocated environment, the trailer 100 may be secured to resist wind or water, with the occupancy compartments being preferably at least 18" above ground. The mostly metallic construction protects against fire, and the multiple compartments allows or multiple occupants and/or allows for occupants to sleep separate from other activity.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

What is claimed is:

1. An emergency shelter comprising:
   an enclosed occupancy volume formed segmented into at least two chambers, a first chamber adjacent to and separate from a second chamber;
   said first chamber having a portion of the occupancy volume floor that is at least 18" above a base plane defined by the lowest point of the emergency shelter during deployment forming an emergency shelter lower resting plane;
   said at least two chambers formed of walls made of fireproofed plate steel, said at least two chambers being releasably connected by a passage formed between the chamber via a removable partition or other access structure;

at least three closeable access orifices formed in the walls, ceiling or floor creating access to and egress from the occupancy volume;

at least one ventilation passage formed by each said at least one closeable access orifice; and a chassis supporting the enclosed occupancy volume, said chassis further comprising:

an axle supporting a plurality of wheels on a suspension;

said suspension being retractable in a manner allowing the plurality of wheels extended to allow for road transport or retracted for affixing the chassis to a foundation; and wherein the emergency shelter is configured to be submersible in a body of water while maintaining internal habitability.

2. The emergency shelter of claim 1, wherein said chassis further comprises a towable and street legal structure frame.

3. The emergency shelter of claim 2, wherein said walls further comprise fireproofing of the plate steel selected from the group consisting of: layered heat blanket; and an applied fire-resistive material.

4. The emergency shelter of claim 2, wherein the at least three closeable access orifice are each positioned and oriented on different spacial planes, wherein each spacial plane is about 90° apart.

5. The emergency shelter of claim 1, wherein said walls further comprise fireproofing of the plate steel selected from the group consisting of: layered heat blanket; and an applied fire-resistive material.

6. The emergency shelter of claim 5, wherein the at least three closeable access orifice are each positioned and oriented on different spacial planes, wherein each spacial plane is about 90 apart.

7. The emergency shelter of claim 1, wherein the at least three closeable access orifice are each positioned and oriented on different spacial planes, wherein each spacial plane is about 90° apart.

8. A transportable emergency shelter comprising:

a trailer enclosing an occupancy volume, said occupancy volume segmented into at least two chambers, at least one of said at least two chambers adapted to allow for occupants sleeping;

said trailer formed of walls surrounding the occupancy volume and formed of a fire resistant construction;

said trailer mounted on a towable chassis, said chassis comprising a suspension that is retractable to allow wheels to be extended for transport or retracted for securing to a location in a manner such that the occupancy volume is at least 18" above Base Flood Elevation (BFE); and a ground securing mechanism comprising mounting holes or hook attachment points affixed about the chassis for securely mounting to a foundation; and wherein the trailer is configured to be submerged in water while maintaining a habitable environment with the occupancy volume.

9. The transportable emergency shelter of claim 8, wherein said trailer comprises a street legal structure comprising:

a tow bar;

tail lights;

side lights; and a trailer hitch selected from a group consisting of: a Class I hitch; a Class II hitch; a Class III hitch; a Class IV hitch; and a Class V hitch; and said trailer having overall length of no more than 7'4" long and an overall width no more than 7'4" wide and an overall height no more than 6'6" tall.

10. A method of using the emergency shelter of claim 9 comprising the steps:

transporting the emergency shelter over a road from a first location to a deployment location; and securing the chassis to a foundation at the deployment location.

11. The transportable emergency shelter of claim 8, wherein said walls comprise:

plate steel; and a fireproofing.

12. The transportable emergency shelter of claim 11, wherein said fireproofing is selected from a group consisting of: heat resistant blankets; a spray-applied fire-resistive material; a low-density fibers or cementitious compound; and a heat resistant paint.

13. The transportable emergency shelter of claim 12, wherein said walls further comprising a covering an inside surface to allow customization of the occupancy volume.

14. The transportable emergency shelter of claim 11, wherein the walls form one or more discrete viewing ports and one or more access/egress door.

15. The transportable emergency shelter of claim 14 wherein said walls comprise:

plate steel; and a fireproofing.

16. The transportable emergency shelter of claim 15, wherein said fireproofing is selected from a group consisting of: heat resistant blankets; a spray-applied fire-resistive material; a low-density fibers or cementitious compound; and a heat resistant paint.

17. The transportable emergency shelter of claim 16, wherein said walls further comprising a covering an inside surface to allow customization of the occupancy volume.

18. A method of using the transportable emergency shelter of claim 17 comprising the steps:

transporting the trailer over a road from a first location to a deployment location; and securing the chassis to a foundation at the deployment location.

19. The transportable emergency shelter of claim 8, further comprising an diversion covering providing an outwardly appearance to divert the appearance of the basic structure element.

20. The transportable emergency shelter of claim 19, wherein said diversion covering further comprises a heat shrink vinyl film.

* * * * *